(No Model.)

R. HOLMES.
VALVE.

No. 597,415. Patented Jan. 18, 1898.

Attest,
Lydia Graham
Nora Graham

Inventor
Robert Holmes
By L. P. Graham
Atty.

UNITED STATES PATENT OFFICE.

ROBERT HOLMES, OF DANVILLE, ILLINOIS, ASSIGNOR TO THE ROBERT HOLMES & BROS., INCORPORATED, OF SAME PLACE.

VALVE.

SPECIFICATION forming part of Letters Patent No. 597,415, dated January 18, 1898.

Application filed April 27, 1896. Serial No. 589,209. (No model.)

*To all whom it may concern:*

Be it known that I, ROBERT HOLMES, of Danville, in the county of Vermilion and State of Illinois, have invented certain new and useful Improvements in Valves, of which the following is a specification.

This invention is designed to facilitate the inflation of pneumatic tires and the like. It is exemplified in the structure hereinafter described, and it is defined in the appended claim.

Figure 1:
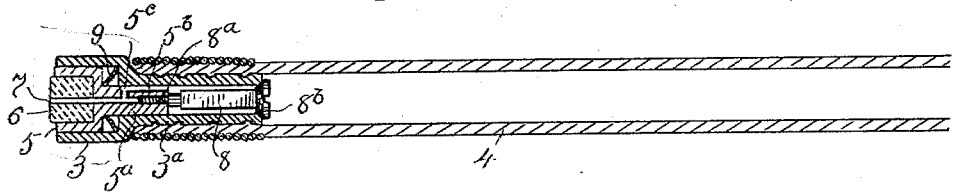
Figure 2:
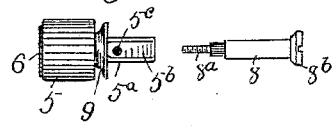
Figure 3:
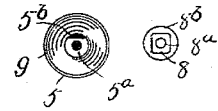
Figure 4:
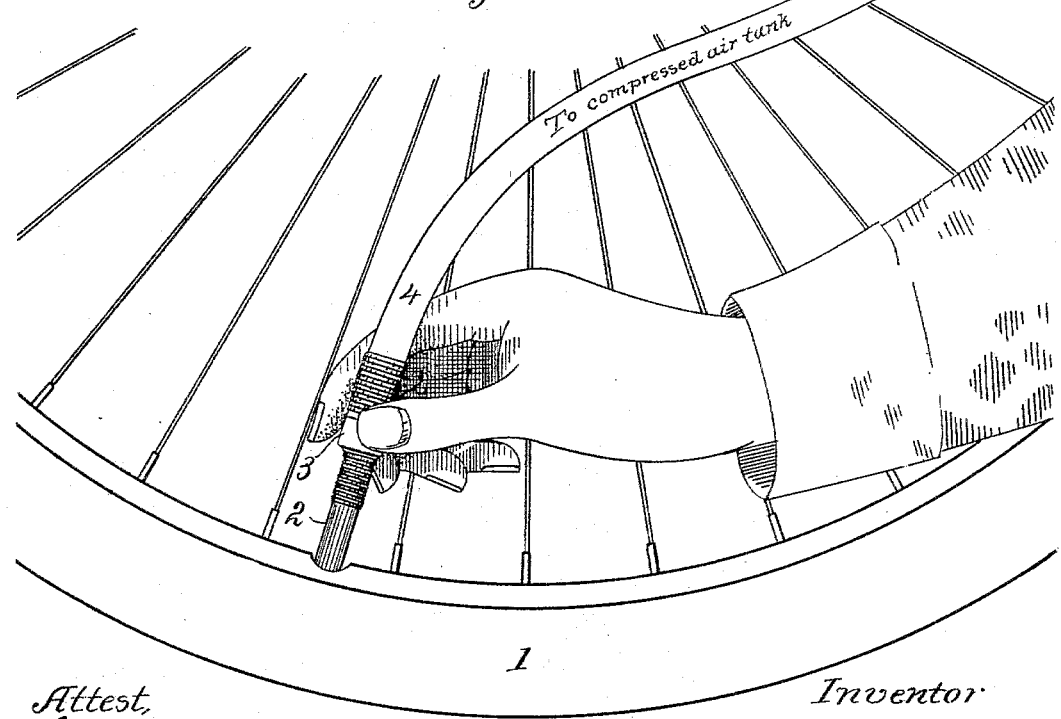

In the drawings forming part of this specification, Figure 1 is a section lengthwise of the valve and the air-tube with which it is connected. Fig. 2 is a representation of the valve-stem with its two separable parts detached. Fig. 3 shows the conjoining ends of the parts of the valve-stem. Fig. 4 illustrates the manner in which the valve is put into use.

In Fig. 4 a fragment of an inflatable bicycle-tire is shown at 1, and the nipple thereof is shown at 2. The valve-shell consists of an outer end 3 and a reduced end $3^a$. The outer end has a cylindrical chamber, and a bore of smaller diameter extends from the inner wall of such chamber through the reduced portion of the shell. The valve-stem consists of two parts, one of which protrudes slightly beyond the outer end of the shell, while the other end comprises the valve proper, which closes against the inner end of the shell. The outer part of the valve-stem consists of the head 5, which has a recess in its outer face, and the reduced part $5^a$, which has a central bore 7, an external longitudinal depression $5^b$, and a hole $5^c$, which connects the external depression with the internal bore. A block 6, of rubber or the like, is fitted in the recess in the outer part of the valve-stem, and it has a central bore that coincides with the bore of the contracted part $5^a$. The inner part of the valve-stem consists of the bolt 8, which is square in cross-section, or is otherwise shaped to provide an external air-passage. One of its ends $8^a$ is threaded to conform to threads in the central bore of the outer part of the stem, and its other end $8^b$ is enlarged to form a valve. There is a space between the inner surface of the head 5 and the opposing wall of the chamber of the shell, and a compression-spring, as 9, which is a concavo-convex rubber washer, occupies such space and tends to hold the valve closed and the outer end of the stem protruded slightly beyond the shell. The washer 9 performs the function of a spring and also acts as a packing for the valve-stem. As the spring is compressed in act of opening the valve it is expanded laterally in a manner to increase the efficiency of the packing.

A flexible tube 4 is fastened onto the reduced end of the valve-shell, and it extends to a tank in which air is held under suitable pressure, or it is otherwise supplied with compressed air.

Ordinarily the valve is held tightly closed by air-pressure and the action of spring 9. When it is desired to inflate a tire or other inflatable object, the cap of the nipple is removed and the rubber tip of the valve is pressed against the end of the nipple with sufficient force to open valve $8^b$ by pressing out of contact with the inner end of the valve-shell and to form an air-tight juncture between the tip and the nipple. When this is done, air will be forced into the tire until the tire is suitably inflated, and when the valve is raised from contact with the nipple, or when pressure is relaxed, the valve $8^b$ will automatically close.

By means of the valve described air may be held under pressure in a suitable tank and resupplied as used, and bicycle-riders may inflate their own tires from the supply in the tank without danger of damaging the valve or wasting the air. While this is the principal purpose for which I have designed the valve, it is not improbable that other uses for it may exist or be hereinafter found.

Having thus described my invention, I claim as new and desire to secure by Letters Patent—

In a valve, the combination of a shell bored throughout and having the bore enlarged at one end to form a shoulder, a hollow valve-stem extended through the shell and having one end enlarged to conform to the enlarged bore of the shell, a valve on the inner end of the stem adapted to bear against the end of the shell, and an elastic concavo-convex washer between the enlarged end of the stem and the shoulder of the shell substantially as set forth.

In testimony whereof I sign my name in the presence of two subscribing witnesses.

ROBERT HOLMES.

Attest:
FRANK LINDLEY,
HARRY O. LUFT.